US012107328B2

(12) United States Patent
Ravichandran et al.

(10) Patent No.: US 12,107,328 B2
(45) Date of Patent: Oct. 1, 2024

(54) ELECTRONIC DEVICES WITH INTERCONNECTED GROUND STRUCTURES

(71) Applicant: Apple Inc., Cupertino, CA (US)

(72) Inventors: Siddharth Ravichandran, San Jose, CA (US); Puneeth Prahalad, Cupertino, CA (US); Vijaykrishnan Ramakrishnan, San Jose, CA (US); Sathish Shanbhag Kota, San Jose, CA (US)

(73) Assignee: Apple Inc., Cupertino, CA (US)

( * ) Notice: Subject to any disclaimer, the term of this patent is extended or adjusted under 35 U.S.C. 154(b) by 186 days.

(21) Appl. No.: 17/828,859

(22) Filed: May 31, 2022

(65) Prior Publication Data

US 2023/0387584 A1 Nov. 30, 2023

(51) Int. Cl.

| | |
|---|---|
| ***H01Q 1/48*** | (2006.01) |
| ***H01Q 1/22*** | (2006.01) |
| ***H01Q 1/24*** | (2006.01) |
| ***H01Q 1/52*** | (2006.01) |

(52) U.S. Cl.
CPC ............ *H01Q 1/48* (2013.01); *H01Q 1/2291* (2013.01); *H01Q 1/521* (2013.01)

(58) Field of Classification Search
CPC ........ H01Q 1/48; H01Q 1/2291; H01Q 1/521; H01Q 1/243; H01Q 21/28; H01Q 1/252
See application file for complete search history.

(56) References Cited

U.S. PATENT DOCUMENTS

| | | | |
|---|---|---|---|
| 8,989,672 B2 | 3/2015 | Pascolini et al. | |
| 10,908,654 B2 | 2/2021 | Oster et al. | |
| 11,641,067 B1 * | 5/2023 | Merola .............. | H01Q 21/0025 455/575.7 |
| 2012/0112969 A1 | 5/2012 | Caballero et al. | |
| 2013/0093642 A1 * | 4/2013 | Kurashima ............ | G06K 19/00 343/848 |
| 2014/0028525 A1 | 1/2014 | Ying | |
| 2017/0033440 A1 * | 2/2017 | Kim ........................ | H01Q 1/243 |
| 2018/0248251 A1 * | 8/2018 | Son ........................ | H01Q 9/0421 |
| 2019/0081386 A1 | 3/2019 | Edwards et al. | |

(Continued)

FOREIGN PATENT DOCUMENTS

WO 2022046428 A1 3/2022

OTHER PUBLICATIONS

U.S. Appl. No. 17/694,486, filed Mar. 14, 2022.

*Primary Examiner* — Hoang V Nguyen
(74) *Attorney, Agent, or Firm* — Treyz Law Group, P.C.; Tianyi He

(57) ABSTRACT

An electronic device may include wireless circuitry having one or more antennas. An antenna ground for an antenna may be formed from two separate conductive ground structures coupled to each other via a conductive interconnect structure. A slot element may be formed in one of the conductive ground structures to reject signals at one or more victim frequencies resulting from spurious signals generated by a non-ohmic contact formed between the conductive interconnect structure and the one of the conductive ground structures. The conductive interconnect structure may overlap and excite the slot element, which serves as an ineffective radiator at the one or more victim frequencies.

20 Claims, 10 Drawing Sheets

(56) References Cited

U.S. PATENT DOCUMENTS

| | | | | |
|---|---|---|---|---|
| 2019/0260116 | A1 | 8/2019 | Wei et al. | |
| 2020/0021016 | A1 | 1/2020 | Son et al. | |
| 2020/0412001 | A1* | 12/2020 | Ayala Vazquez ...... | H01Q 1/243 |
| 2021/0066781 | A1 | 3/2021 | Oh et al. | |
| 2022/0166862 | A1 | 5/2022 | Lee et al. | |
| 2023/0006333 | A1* | 1/2023 | Wu .......................... | H01Q 7/00 |
| 2023/0146114 | A1* | 5/2023 | Wu .......................... | H01Q 5/35 343/702 |
| 2023/0223677 | A1* | 7/2023 | Wu ........................ | H01Q 1/243 343/702 |
| 2024/0014544 | A1* | 1/2024 | Jeon ......................... | H01Q 1/12 |

* cited by examiner

ELECTRONIC DEVICES WITH INTERCONNECTED GROUND STRUCTURES

BACKGROUND

This relates generally to electronic devices and, more particularly, to electronic devices with wireless communications capabilities.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Antenna components, especially in compact devices, often include multiple ground structures that are interconnected. Improperly interconnected ground structures have the potential to interfere with the operation of wireless components in a wireless device. As such, care must be taken when implementing antenna components such as ground structures in an electronic device.

SUMMARY

An electronic device may include wireless circuitry having one or more antennas. Multiple separate conductive ground structures may be coupled to each other via a conductive interconnect structure. The collective interconnected structures may form an antenna ground for one or more of the antennas. In some illustrative configurations, the conductive interconnect structure may form a non-ohmic contact with the ground structures, thereby introducing a spurious signal source. The spurious signal source may cause aggressor portions of the wireless circuitry to undesirably influence victim portions of the wireless circuitry. As an example, the spurious signal source may generate at a harmonic victim frequency based on radio-frequency signals at a fundamental aggressor frequency.

One or more of the conductive ground structures may include a slot element configured to reject signals at one or more victim frequencies resulting from the spurious signal source. The conductive interconnect structure may overlap and excite the slot element, which serves as an ineffective radiator at the one or more victim frequencies thereby reducing the impact of signals at the one or more victim frequencies on the victim portions of the wireless circuitry. With the implementation of the slot element, the conductive ground structure may exhibit localized standing waves around the slot element instead of across the entirety of the conductive ground structure.

If desired, the multiple separate conductive ground structures may be formed from conductive portions of a display assembly such as a display backplate and a display (cover layer) frame structure.

DETAILED DESCRIPTION

Figure 1:
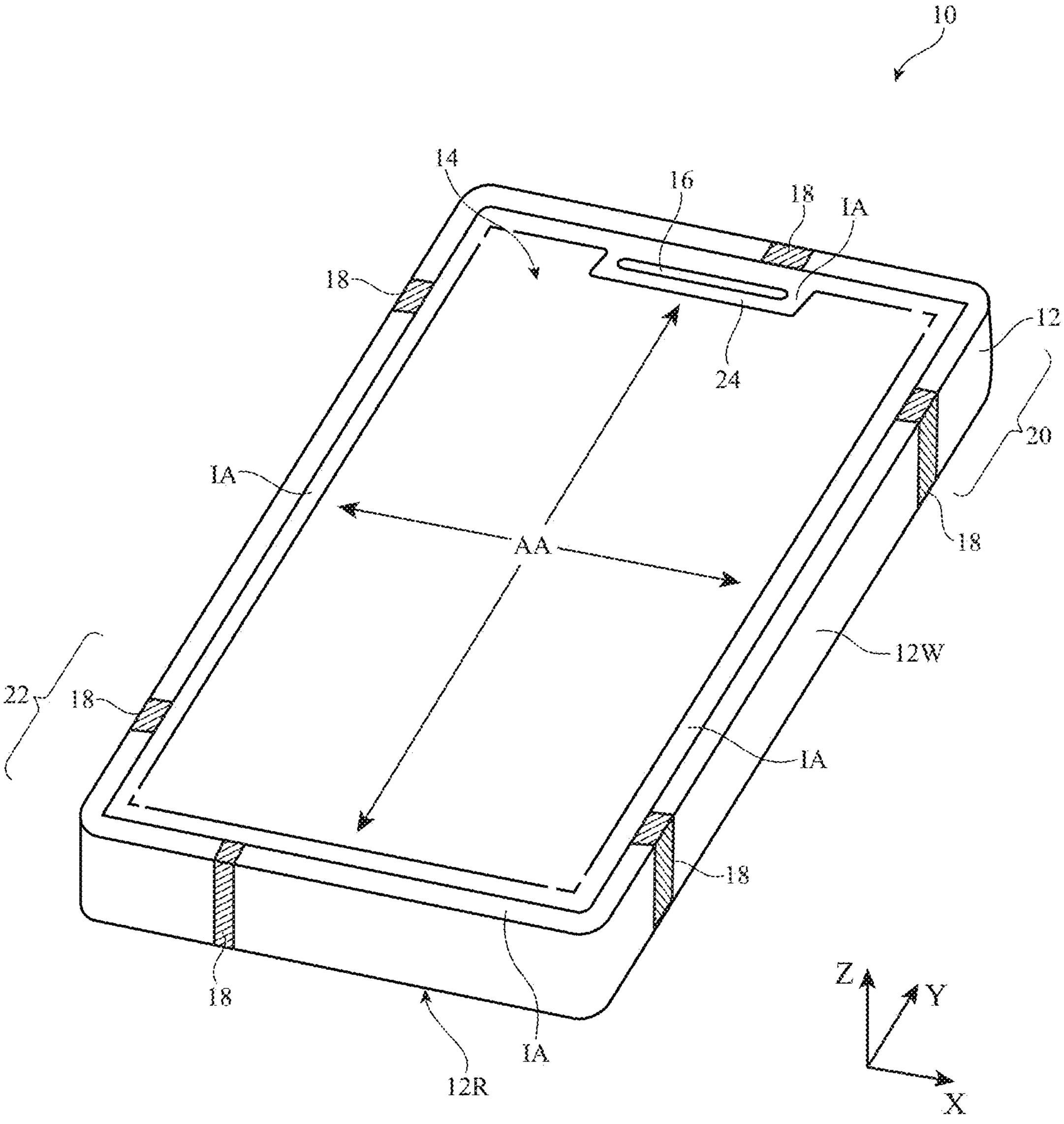
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
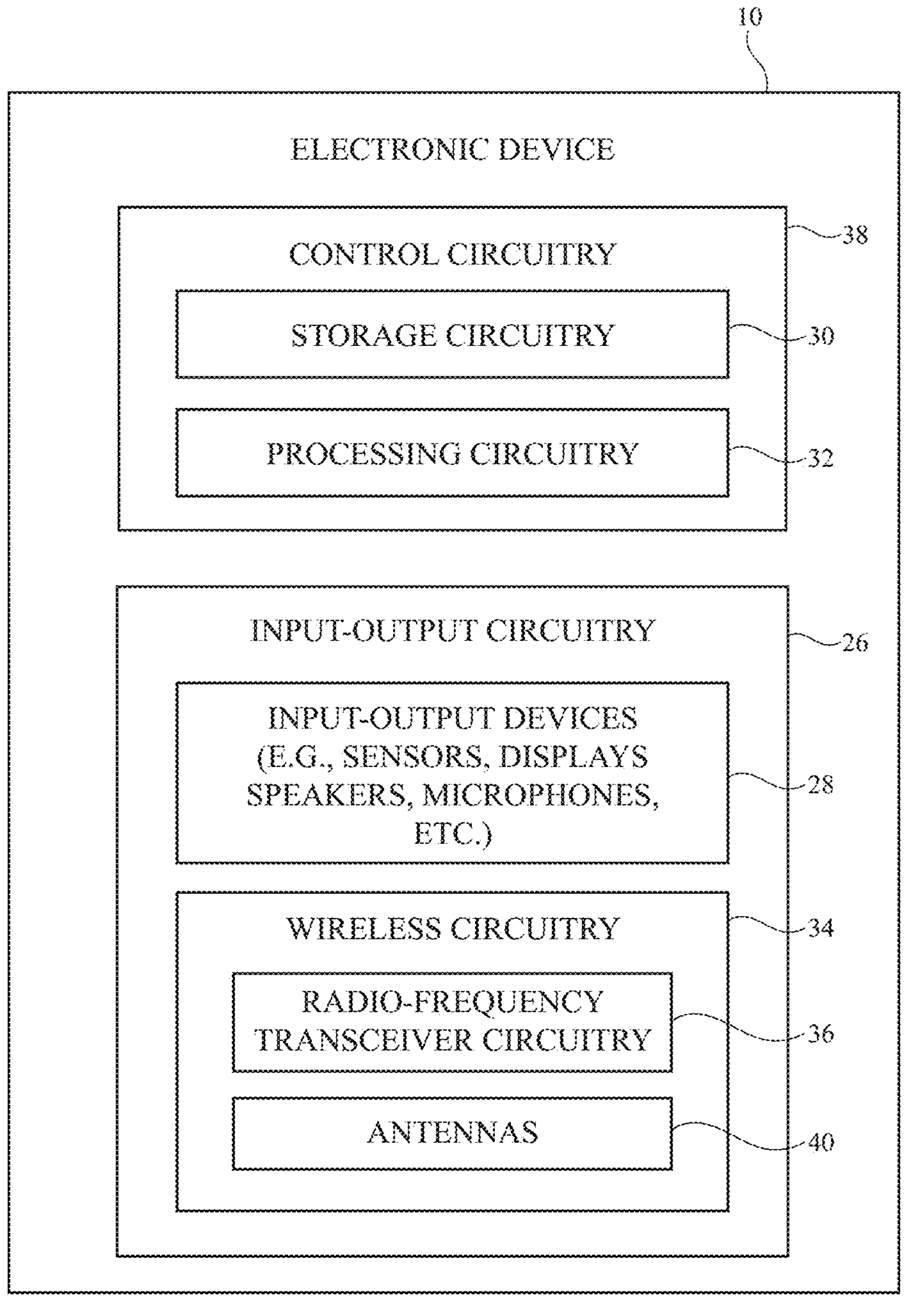
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include on one or more microprocessors, microcontrollers, digital signal processors, host processors, baseband processor integrated circuits, application specific integrated circuits, graphics processing units, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals within corresponding frequency bands at radio frequencies (sometimes referred to herein as communications bands or simply as "bands"). The frequency bands handled by radio-frequency transceiver circuitry 36 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to free space through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. If desired, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands.

Figure 3:
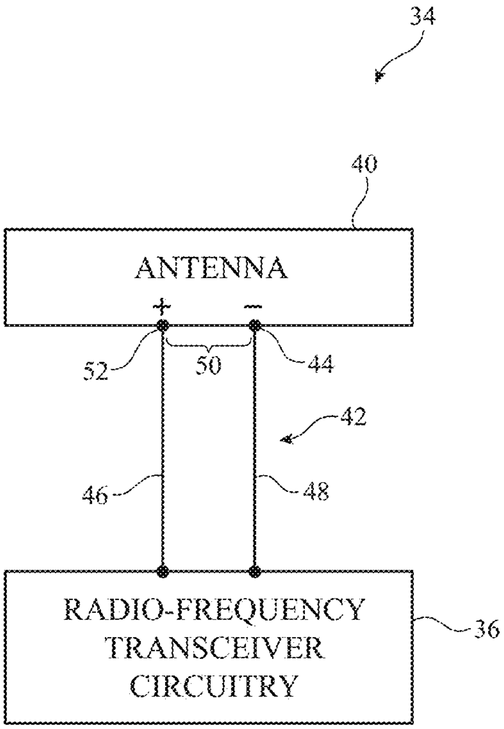
FIG. 3 is a schematic diagram of illustrative wireless circuitry in accordance with some embodiments.

FIG. 3 is a schematic diagram showing how a given antenna 40 may be fed by radio-frequency transceiver circuitry 36. As shown in FIG. 3, antenna 40 may have a corresponding antenna feed 50. Antenna 40 may include an antenna resonating (radiating) element and an antenna ground. Antenna feed 50 may include a positive antenna feed terminal 52 coupled to the antenna resonating element and a ground antenna feed terminal 44 coupled to the antenna ground.

Radio-frequency transceiver circuitry 36 may be coupled to antenna feed 50 using a radio-frequency transmission line path 42 (sometimes referred to herein as transmission line path 42). Transmission line path 42 may include a signal conductor such as signal conductor 46 (e.g., a positive signal conductor). Transmission line path 42 may include a ground conductor such as ground conductor 48. Ground conductor 48 may be coupled to ground antenna feed terminal 44 of antenna feed 50. Signal conductor 46 may be coupled to positive antenna feed terminal 52 of antenna feed 50.

Transmission line path 42 may include one or more radio-frequency transmission lines. The radio-frequency transmission line(s) in transmission line path 42 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 42. Filter circuitry, switching circuitry, impedance matching circuitry, phase shifter circuitry, amplifier circuitry, and/or other circuitry may be interposed on transmission line path 42, if desired. One or more antenna tuning components for adjusting the frequency response of antenna 40 in one or more bands may be interposed on transmission line path 42 and/or may be integrated within antenna 40 (e.g., coupled between the antenna ground and the antenna resonating element of antenna 40, coupled between different portions of the antenna resonating element of antenna 40, etc.).

If desired, one or more of the radio-frequency transmission lines in transmission line path 42 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All the multiple layers of the laminated structures may be batch laminated together (e.g., in a single pressing process) without adhesive (e.g., as opposed to performing multiple pressing processes to laminate multiple layers together with adhesive).

Figure 4:
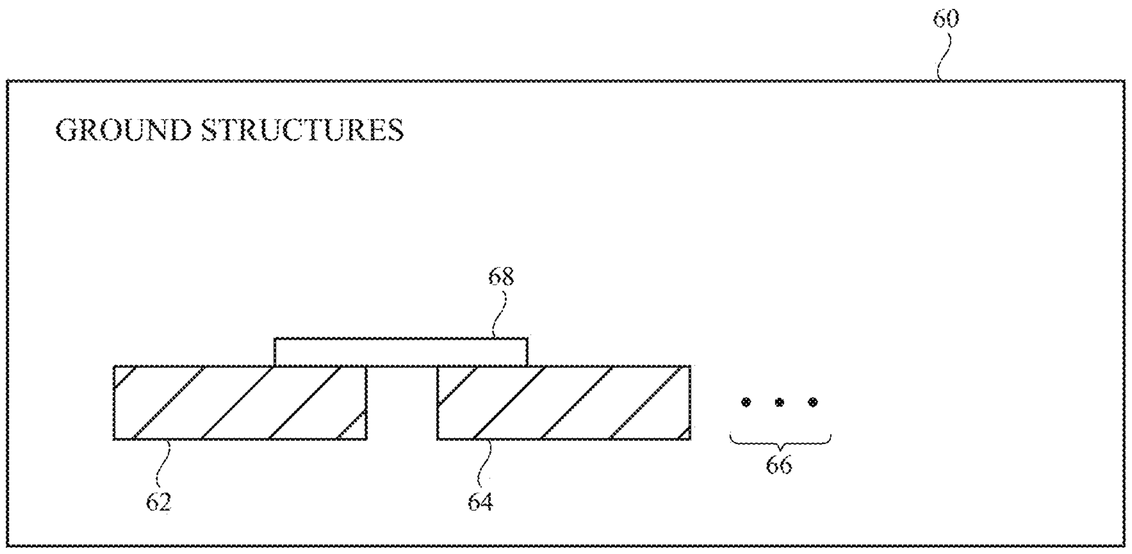
FIG. 4 is a schematic diagram of illustrative ground structures in accordance with some embodiments.

FIG. 4 is a schematic diagram showing how illustrative ground structures may be implemented within device 10. In particular, to implement an electrical ground for components such as an antenna ground for one or more of antennas 40 in device 10 as described in connection with FIG. 3, device 10 may include multiple ground structures 60 (e.g., structures that collectively form part of the antenna ground for one or more of antennas 40 in device 10). The multiple ground structures may include a number of discrete individual elements, illustratively shown in FIG. 4 as a ground structure 62, a ground structure 64, and other additional ground structures 66. Two or more of these individual ground elements may be electrically interconnected using conductive grounding interconnect structures such as interconnect element 68 which connects ground structure 62 to ground structure 64, as shown in FIG. 4.

Various elements in device 10 may serve as each of the ground structures 60 for one or more of antennas 40 on device 10. As examples, ground structures 60 may include conductive portions of a display module or display assembly, one or more metal layers such as a metal layer used to form a rear housing wall and/or an internal support structure for device 10 (e.g., a conductive structural support plate for device 10), one or more other conductive portions of housing 12 such as conductive portions of sidewalls 12W, conductive traces on a printed circuit board, conductive portions of one or more components in device 10, and/or other conductive elements in device 10. As further examples, conductive interconnect structures (e.g., conductive interconnect structure 68) in ground structures 60 may include conductive adhesive, conductive tape, conductive foam, conductive springs, conductive pins, welds, and/or other conductive elements that serve to electrically (and if desired, physically) interconnect two or more individual ground structures.

When multiple pieces of individual antenna ground structures are interconnected, a common and effectively enlarged antenna ground plane may be formed within device 10 for one or more of antennas 40, thereby enhancing antenna performance. This may be especially advantageous in a compact or small form factor device where a single continuous piece of antenna ground plane may take up valuable space within the device and may not easily conform to the form factor of the device, and is therefore undesirable. The interconnected ground structures may also implement desired antenna ground plane geometries and exhibit other desired characteristics to enhance antenna performance.

However, interconnecting individual antenna ground structures can sometimes lead to the introduction of spurious signal sources that can disrupt wireless communications of device 10. As examples, when using some types of conductive interconnect structures such as conductive adhesive, conductive tape, conductive foam, or other conductive interconnect structures conducive to forming non-ohmic contacts (e.g., contacts that exhibit non-linear voltage-current behavior) to one or more of the interconnected ground structures, these conductive interconnect structures (along with their non-ohmic contacts) may serve as spurious signal sources. In other words, when radio-frequency signals are being conveyed by an antenna 40 containing the interconnected antenna ground structures (e.g., the conductive interconnect structure forms a part of the antenna ground to which the antenna feed for antenna 40 is connected), the non-linear characteristic of the contact may result in the generation of harmonic frequency signals (e.g., signals at one or more harmonics or integer multiples of the frequencies of conveyed signals), and/or intermodulated frequency signals (e.g., signals at one or more non-harmonic frequencies of the conveyed signals resulting from the mixing of two or more conveyed signals), which are collectively referred to herein as spurious signals. As examples, the harmonic frequency signals may include second-order harmonics, third-order harmonics, etc. As examples, the intermodulated frequency signals may include second-order intermodulation products, third-order intermodulation products, fifth-order intermodulation products, etc.

As an example, an antenna 40 may have an antenna ground that includes ground structures 62 and 64 and conductive interconnect structure 68 in FIG. 4. In scenarios where conductive interconnect structure 68 is connected to ground structure 62 (and/or ground structure 4) via a non-ohmic contact, conductive interconnect structure 68 (and its non-ohmic contact) may form a spurious signal source.

Figure 5:
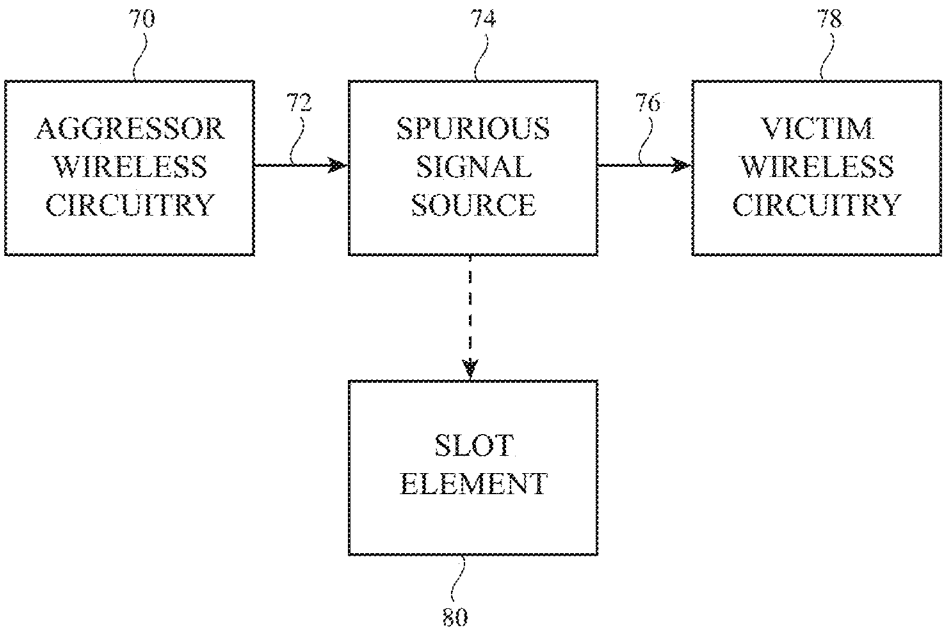
FIG. 5 is a schematic diagram of an illustrative spurious signal source in wireless circuitry in accordance with some embodiments.

FIG. 5 is a schematic diagram showing how the generation of spurious signals may impact wireless communications of a wireless device in an illustrative example. As shown in FIG. 5, a wireless device such as device 10 may include wireless circuitry 70 (forming a portion of wireless circuitry 34 in FIG. 2) configured to convey radio-frequency signals 72 at a set of frequencies (e.g., in one or more frequency bands). In one illustrative configuration, wireless circuitry 70 may include an antenna and a radio that uses the antenna to convey radio-frequency signals 72. In particular, radio-frequency signals 72 may be conveyed to an antenna resonating element as well as an antenna ground of the antenna that contains a conductive interconnect structure forming spurious signal source 74 (e.g., in the manner as described above). In other words, while radio-frequency signals 72 are being conveyed into freespace, corresponding radio-frequency signals 72 are also being conveyed to spurious signal source 74 in the antenna ground for wireless circuitry 70 (e.g., via a ground conductor 48 and a corresponding ground feed terminal 44 in FIG. 3).

In the example of FIG. 5, spurious signal source 74 may generate spurious radio-frequency signals 76 based on received radio-frequency signals 72. As examples, spurious radio-frequency signals 76 may include one or more harmonic frequency signals or signals at harmonics of the frequencies of radio-frequency signals 72, one or more intermodulated frequency signals or signals (at non-harmonic frequencies) resulting from the mixing of radio-frequency signals 72 of different frequencies, and/or other spurious signals resulting from other radio-frequency signals. Configurations in which radio-frequency signals 76 include harmonic frequency signals are described herein as an illustrative example.

In the example of spurious harmonic radio-frequency signals 76 being generated, one or more of the interconnected ground structures may exhibit standing waves (e.g., a standing wave current and/or voltage distribution) across its entire structure. This can undesirably cause radiation of and further propagate spurious radio-frequency signals 76. Wireless circuitry 78 in device 10 (forming a portion of wireless circuitry 34 in FIG. 2) different from wireless circuitry portion 70 may perceive (e.g., receive) and be adversely impacted by the propagated spurious harmonic radio-frequency signals 76. In particular, wireless circuitry 78 may be sensitive to radio-frequency signals at the frequencies of radio-frequency signals 76.

As an example, wireless circuitry 78 may include an antenna and a corresponding radio that uses the antenna to convey radio-frequency signals at a set of frequencies (e.g., in one or more frequency bands), which overlap or include the frequencies of spurious radio-frequency signals 76. In this scenario, wireless circuitry 78 may receive the radiated spurious signals 76, which adversely impacts the operation of wireless circuitry 78 (e.g., by increasing the noise floor level, thereby decreasing signal-to-noise ratio, for signals received at wireless circuitry 78).

Because the conveyance of radio-frequency signals at wireless circuitry 70 ultimately results in spurious signals that impact other wireless circuitry, wireless circuitry 70 may sometimes be referred to as aggressor wireless circuitry 70 (e.g., having one or more aggressor radios and antennas that convey radio-frequency signals that result in the spurious signals). The one or more frequencies of radio-frequency signals 72 resulting in the spurious signals may sometimes be referred to as one or more aggressor frequencies.

Because wireless circuitry 78 receives spurious signals resulting from radio-frequency signals from other wireless circuitry, wireless circuitry 78 may sometimes be referred to as victim wireless circuitry 78 (e.g., having one or more victim radios and antennas that receive and process the spurious signals). The one or more frequencies of spurious radio-frequency signals 76 may sometimes be referred to as one or more victim frequencies. In the example of harmonics interference, the one or more aggressor frequencies may be at fundamental frequencies, while the one or more victim frequencies are the harmonics of these fundamental frequencies.

In some illustrative configurations described herein as an example, the aggressor wireless circuitry may be associated with a cellular radio and one or more antennas coupled to the cellular radio, and the aggressor frequencies may be one or more frequencies in a cellular low band (e.g., at a frequency of 600 MHz). In this example, the victim wireless circuitry may be associated with a Bluetooth® radio and/or a Wi-Fi® radio and one or more antennas coupled to these radios, and the victim frequencies may be one or more frequencies in a 2.4 GHz Bluetooth® band, in a 2.4 GHz WLAN band, in a 5 GHz WLAN band (e.g., at a frequency of 2.4 GHz, at a frequency of 5.5 GHz, etc.). These frequencies are merely illustrative. In other scenarios, frequencies in one or more other frequency bands may impact or be impacted in a similar manner.

The impacts of spurious signals described above in connection with FIG. 5 are merely illustrative. In general, the existence of one or more spurious signal sources and radiation of corresponding spurious radio-frequency signals may interfere with the operation of any portion of wireless circuitry 34 (FIG. 1) or other components in device 10.

To mitigate the above-mentioned issues resulting from one or more spurious signal sources such as spurious signal source 74, ground structures 60 may include corresponding slot elements such as slot element 80 coupled to spurious signal source 74. In other words, a first ground structure, to which a second ground structure is connected via a conductive interconnect structure, may have a slot element 80 formed therein. Slot element 80 may be formed at the (non-ohmic) contact between the conductive interconnect structure and the first ground structure. The conductive interconnect structure may overlap and therefore be coupled to slot element 80.

In such a manner, when radio-frequency signals 72 are received at the second ground structure (e.g., via an antenna feed terminal coupled to the second ground structure) and conveyed to the first ground structure as spurious radio-frequency signals 76 by way of the conductive interconnect structure and the non-ohmic contact serving as spurious signal source 74, slot element 80 may stop the propagation of the generated spurious radio-frequency signals 76 onto the entire structure of the first ground structure (as standing waves). Instead, spurious radio-frequency signals 76 may be locally coupled onto slot element 80.

In other words, when slot element 80 is excited by the reception of spurious radio-frequency signals 76, the portion of the first ground structure defining the boundaries of slot element 80 (instead of the entirety of the first ground structure) exhibits standing waves corresponding to spurious radio-frequency signals 76. Slot element 80 may be configured to reject one or more (victim) frequencies of interest (e.g., may have dimensions that efficiently radiate at frequencies outside of the one or more frequencies of interest). This local excitation of slot element 80 can help reduce the intensity or amplitude of the standing waves at the one or more victim frequencies of spurious signals 76 (relative to scenarios in which standing waves are exhibited across the entirety of a ground structure).

Figure 6:
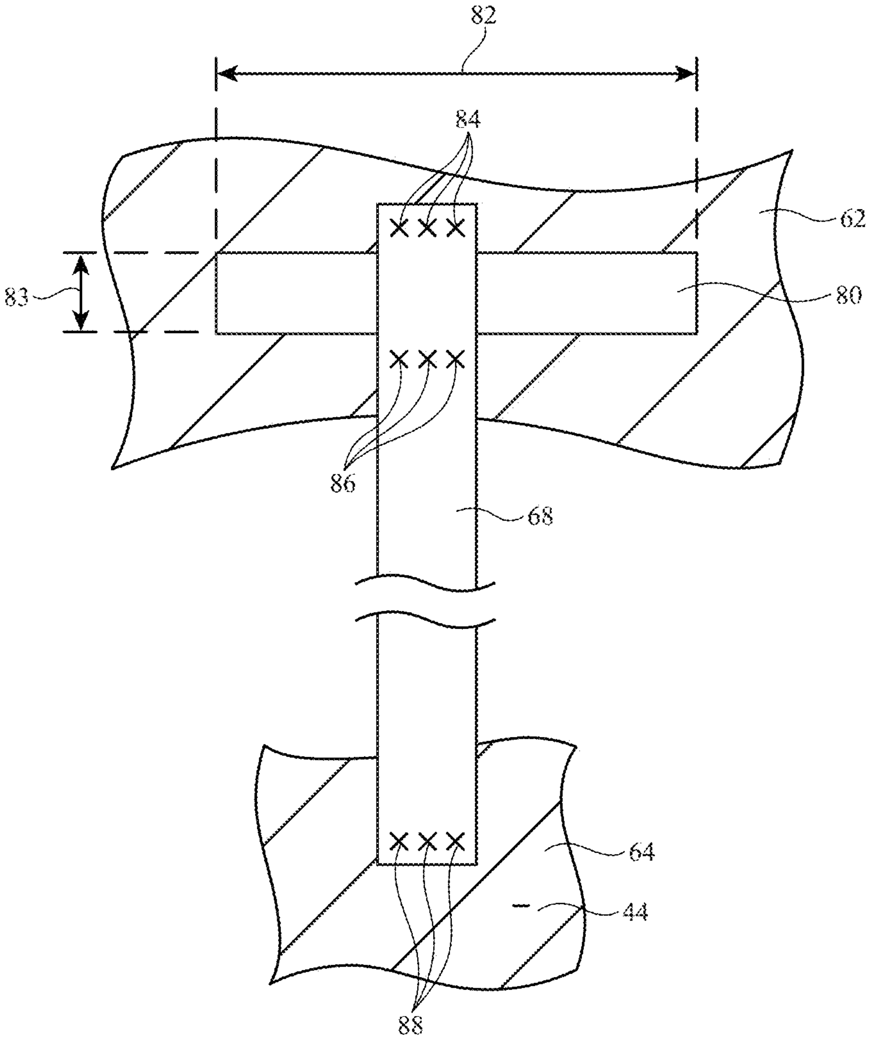
FIG. 6 is a plan view of two illustrative portions of ground structures, one of which has a slot element for rejecting signals at one or more victim frequencies, in accordance with some embodiments.

FIG. 6 is a top-down view of an illustrative slot element implemented within ground structures 60 (in FIG. 4). In particular, FIG. 6 shows illustrative portions of the two individual ground structures 62 and 64, with slot element 80 formed within the illustrated portion of ground structure 62.

Slot element 80 may be a dielectric-filled opening within conductive material (e.g., conductive ground structure 62). The opening of slot element 80 may be filled with dielectric material such as air or solid dielectric material. In the configuration of FIG. 6, slot element 80 (sometimes referred to herein as slot 80, opening 80, notch 80, interference-mitigating slot element 80, spurious signal mitigating slot element 80, or victim frequency rejection structure 80) is a closed slot, because portions of ground structure 62 completely surround and enclose slot 80 along lateral peripheral edges. If desired, slot element 80 may be implemented as an open slot formed in ground structure 62 (e.g., by forming slot element 80 such that one of its lateral peripheral edges extends to a peripheral edge of ground structure 62 and the slot element is not completely surrounded by conductive material).

To interconnect the two pieces of ground structure 62 and 64 and thereby form a common antenna ground, conductive interconnect structure 68 may extend from ground structure 62 to ground structure 64. In particular, interconnect structure 68 may electrically and/or physically connect ground structure 62 to ground structure 64. In the example of FIG. 6, interconnect structure 68 may have an elongated shape with one end coupled to (e.g., contacting) ground structure 62 at one or more locations 84 and one or more locations 86 and an opposing end coupled to (e.g., contacting) ground structure 64 at one or more locations 88. More specifically, interconnect structure 68 may contact ground structure 62 at locations along opposing edges of ground structure 62 defining respective elongated sides of slot element 80. In such a manner, interconnect structure 68 and its contacts at locations 84 and 86 may be configured to excite, feed, or otherwise cause slot element 80 to exhibit standing waves along its perimeter (e.g., along the perimeter of ground structure portion that defines slot element 80) when (spurious) radio-frequency signals are conveyed from interconnect structure 68 onto the portion of ground structure 62 surrounding and defining slot element 80.

In the example of FIG. 6, slot element 80 is an elongated rectangular slot element having a length 82 and a width 83. In general, slot elements tend to exhibit response peaks when the slot perimeter is equal to a target effective wavelength (e.g., where the slot perimeter is equal to two times length 82 plus two times width 83). The effective wavelength may be equal to a freespace wavelength multiplied by a constant value that is determined by the dielectric materials in and surrounding slot element 80. In elongated slot elements where the length is much greater than the width (e.g., the length greater than four times the width, the length greater than eight times the width, the length greater than ten times the width, the length greater than twenty times the width, the length greater than fifty times the width, etc.), the response peaks may be exhibited when the slot length is approximately half of the target wavelength (e.g., is slightly less than half of the target wavelength given a non-zero slot width).

To reduce the effectiveness of the radiation of spurious radio-frequency signals at victim frequencies, slot element 80 may be configured to have dimensions that reduce the frequency response at the victim or spurious signal frequencies. In other words, slot element 80 may have dimensions that are not conducive to response peaks at the victim or spurious signal frequencies (e.g., response peaks are generated at frequencies different from the victim frequencies). As such, when interconnect structure 68 (at its contacts to ground structure 62) excites slot element 80 at the victim signal frequencies, the amplitudes of standing wave current flowing around the perimeter of slot element 80 (e.g., between contacts at locations 84 and 86) at these frequencies may be reduced (relative to scenarios where the dimensions of slot element 80 are designed to effectively radiate at the victim frequencies). This allows slot element 80 to serve as an inefficient radiator at these frequencies and therefore an inefficient propagator of spurious signals. By effectively dissipating signals at these victim frequencies (sometimes referred to herein as rejecting victim frequencies), slot element 80 may therefore reduce the effect of spurious signals (when generated by a spurious signal source) on victim wireless circuitry.

In illustrative configurations described herein as examples, slot element 80 may be elongated. In these examples, to reject certain frequencies and their corresponding wavelengths, slot element 80 may have a length less than one-half of the target wavelength, less than one-fourth of the target wavelength, less than one-eighth of the target wavelength, greater than one-tenth of the target wavelength, greater than one-eighth of the target wavelength, greater than one-fourth of the target wavelength, etc. In scenarios where a single victim frequency exists (e.g., victim wireless circuitry is sensitive to only one frequency of spurious signals), the target wavelength may be the wavelength corresponding to the victim frequency (e.g., based on the wave speed or speed of light, accounting for nearby dielectric effects that result in the use of an effective wavelength as described above, etc.). In scenarios where multiple victim frequencies exist (e.g., victim wireless circuitry is sensitive to multiple frequencies of spurious signals), the target wavelength may be the wavelength corresponding to the lowest victim frequency in the multiple victim frequencies. By configuring slot element 80 to reject the lowest of the victim frequencies (e.g., having the longest of wavelengths) in the manner described above, the same configuration for slot element 80 also rejects the higher victim frequencies.

In illustrative configurations where victim frequencies are in a 2.4 GHz WPAN band, in a 2.4 GHz WLAN band, and in a 5 GHz WLAN band (e.g., at a frequency of 2.4 GHz, at a frequency of 5.5 GHz, etc.), the length of elongated slot element may be 60 mm (e.g., approximately a length of one-half of the target wavelength associated with a victim frequency of 2.4 GHz), 30 mm (e.g., approximately a length of one-half of the target wavelength associated with a victim frequency of 5.5 GHz), 10 mm (e.g., approximately a length of one-tenth of the target wavelength associated with a victim frequency of 2.4 GHz), or any other length to suitably reject these victim frequencies. It may be desirable to configure the elongated slot element with a length closer to one-eighth to one-tenth of the target wavelength to more effectively reject the set of the victim frequencies. However, given manufacturing, form factor, and/or other constraints, the length of the elongated slot element may be adjusted from this range to more suitably accommodate other constraints.

The use of elongated slot element and consequently the consideration of slot length may serve as illustrative and approximate examples for rejecting victim frequencies. If desired, other properties of slot elements such as slot width may also be configured (along with slot length) to provide a slot element for rejecting victim frequencies.

Conductive interconnect structure 68 may be coupled across slot element 80 at a location along the elongated edges of ground structure 62 (e.g., at a location along length 82). If desired, the location along the length of the slot across which interconnect structure 68 is coupled may be adjusted for impedance control (e.g., to control impedance matching between interconnect structure 68 and slot element 80) to enhance rejection of victim frequencies (e.g., decrease frequency response at victim frequencies).

Configurations in which interconnect structure 68 is a conductive tape are sometimes described herein as examples. In these configurations, the conductive tape may be physically adhered to ground structure 62 at locations 84 and 86 across slot element 80 and may be physically adhered to ground structure 64 at locations 88. Simultaneously, these contact locations may also serve as points of electrical (non-ohmic) contact (e.g., provide a low resistance or shorting path between ground structure 62 and interconnect structure 68 and provide a low resistance or shorting path between ground structure 64 and interconnect structure 68, thereby forming a low resistance or shorting path between ground structures 62 and 64 via interconnect structure 68). If desired, the conductive tape may bridge across a lateral gap (absence of conductive material) between ground structure 62 and ground structure 64.

As other examples, interconnect structure 68 may be a conductive adhesive (e.g., a layer of conductive adhesive material deposited over ground structures 62 and 64), a conductive foam (e.g., conductive foam interposed or vertically stacked between ground structures 62 and 64), other interconnect structures configured to form non-ohmic contacts, and/or a combination of multiple types of interconnect structures.

While shown in FIG. 6 to extend laterally across and to overlap non-overlapping ground structures 62 and 64, this configuration of interconnect structure 68 in FIG. 6 is merely illustrative. If desired, the illustrated portions of ground structures 62 and 64 may vertically overlap one another, and interconnect structure 68 may be disposed within the vertical gap between ground structures 62 and 64 and extend between (e.g., be sandwiched between) ground structures 62 and 64.

In general, device 10 may include different individual ground structures oriented relative to one another in different manners and may include interconnect structures connecting the individual ground structures in various orientations. In any of these configurations, one or more slot elements such as slot element 80 may be provided to mitigate the undesired propagation of spurious signals (at one or more victim frequencies).

In some illustrative configurations, an antenna feed terminal (e.g., ground antenna feed terminal 44 in FIG. 3) may be coupled to conductive ground structure 64, and slot element 80 may be formed in a downstream interconnected ground structure 62 (e.g., a ground structure distal to but interconnected via a non-ohmic contact from the ground structure directly connected to the antenna feed terminal). If desired, conductive ground structure 64 may include an analogous slot element (e.g., configured to reject one or more target victim frequencies) instead of or in additional to slot element 80 in ground structure 62.

The configuration of slot element 80 in FIG. 6 is merely illustrative. In general, slot element 80 may have any desired shape (e.g., with dimensions that impart the above-mentioned rejection of victim frequencies). For example, slot element 80 may have a meandering shape with different segments extending in different directions, may have straight and/or curved edges, etc.

While shown in the example of FIG. 6 to be formed in ground structure 62, a victim frequency rejection slot element (e.g., configured in the same manner as slot element 80) may formed in ground structure 64 in addition to or instead of slot element 80 in ground structure 62.

Conductive elements implementing antenna ground structures 62 and 64 (e.g., one or both of which including a respective victim frequency rejection slot element) may be formed from any desired (grounded) conductive electronic device structures. As one illustrative example, antenna ground structure 62 (and antenna ground structure 64) may be formed from conductive structures associated with display 14 (FIG. 1) or generally a display module or display assembly.

Figure 7:
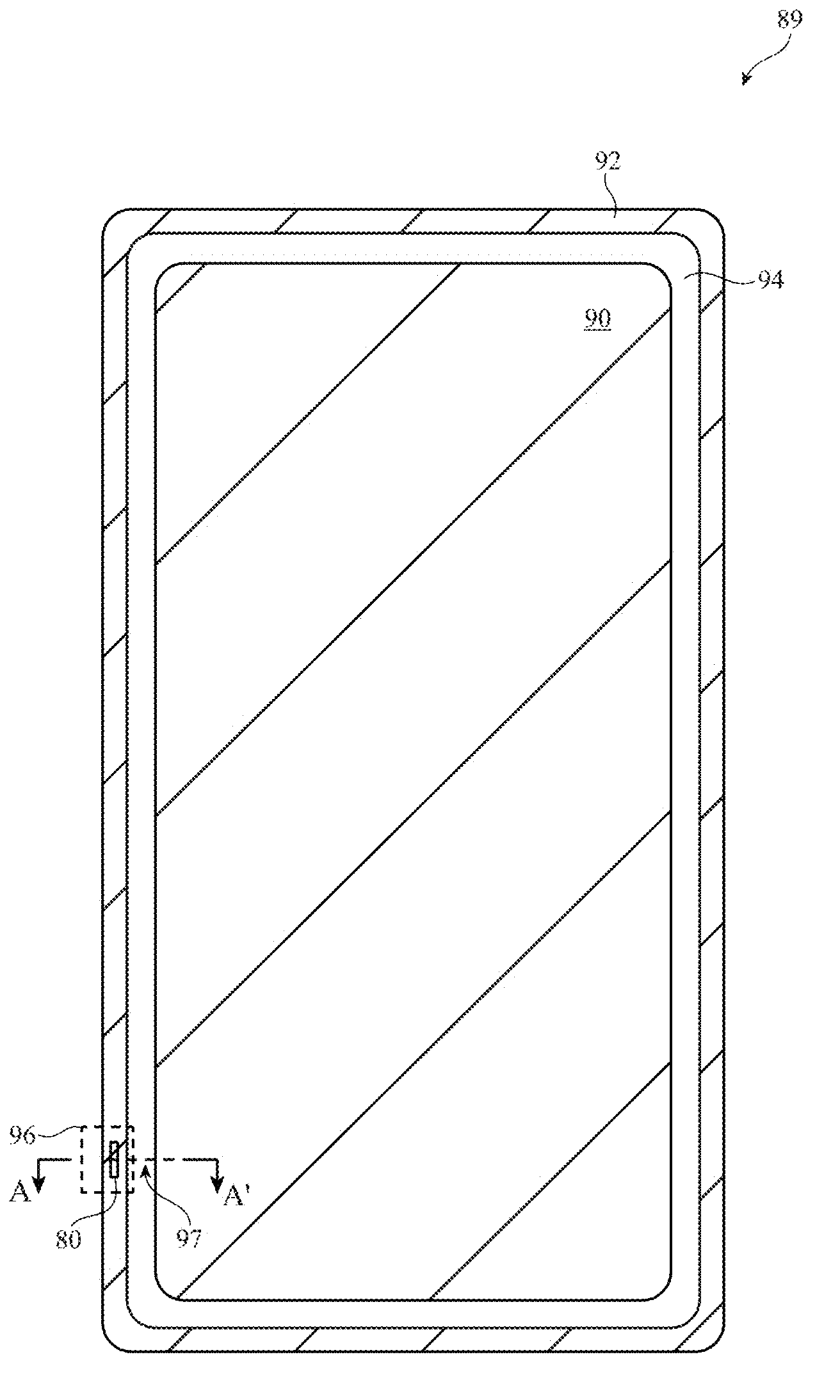
FIG. 7 is a plan view of illustrative interior display module structures having a slot element in a ground structure for rejecting signals at one or more victim frequencies in accordance with some embodiments.
Figure 8:
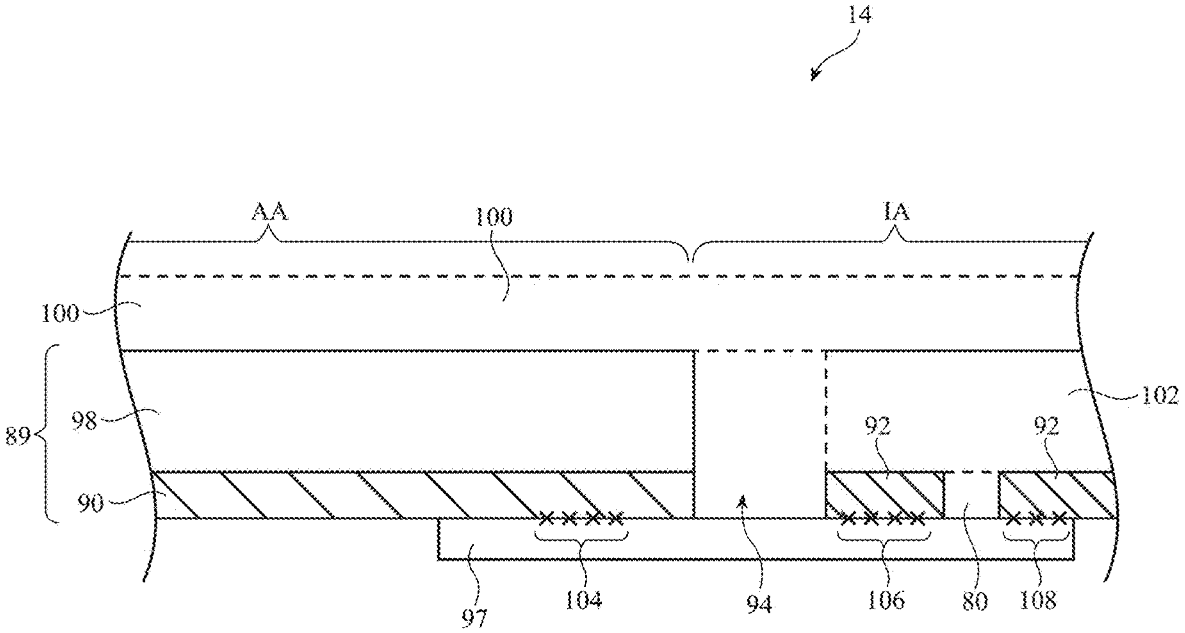
FIG. 8 is a cross-sectional view of an illustrative portion of the display module structures in FIG. 7 in accordance with some embodiments.

FIGS. 7 and 8 are illustrative views of conductive structures in a display configured to form the illustrative ground structures and victim frequency rejection structure (e.g., slot element 80) as described in connection with FIGS. 5 and 6. FIG. 7 is a plan view of illustrative interior display structures in a display module or display assembly for a display 14 of device 10.

As shown in FIG. 7, display module 89 may include a conductive display backplate 90 and a conductive frame structure 92. Display backplate 90 may be separated from frame structure 92 by a non-conductive gap 94. To expand the area of the (antenna) ground structures in device 10, it may be desirable to connect frame structure 92 to backplate 90 to form an expanded ground plane using both structures. As such, a conductive interconnect structure such as interconnect structure 97 (e.g., a conductive tape) may bridge across gap 94 to electrically and physically connect frame structure 92 to backplate 90.

Because interconnect structure 97 may form a non-ohmic contact with frame structure 92 and/or backplate 90, interconnect structure 97 may cause the generation of spurious signals. Without any victim frequency rejection structures, frame structure 92 (when excited by spurious signals generated by interconnect structure 97) may exhibit standing waves (e.g., standing wave current and voltage distributions) across its entire structure around the periphery of display module 89, thereby radiating at the victim frequencies and degrading the performance of victim wireless circuitry. To provide a victim frequency rejection structure, frame structure 92 may include slot element 80 that overlaps interconnect structure 97. In such a manner, spurious signals generated by interconnect structure 97 at its non-ohmic contacts may locally excite slot element 80 (e.g., standing waves are locally exhibited in or are concentrated at region 96) instead of across the entire structure of frame structure 92, thereby reducing the amplitude of the standing waves. Furthermore, slot element 80 may have dimensions configured to reject one or more victim frequencies (e.g., to serve as an inefficient radiator at these frequencies by exhibiting reduced or non-peak frequency responses at these frequencies), thereby further reducing the amplitude of the standing waves.

In some illustrative scenarios, an additional victim frequency rejection slot element may be formed in a ground structure connected to frame structure 92 in which slot element 80 is formed. In some illustrative scenarios (e.g., considering other device constraints), it may be undesirable to form such a slot element in a display backplate.

FIG. 8 is a cross-sectional view of an illustrative portion of the display module structures as viewed along line A-A' in FIG. 7. As shown in FIG. 8, display 14 may include display module 89. Display module 89 may include display layers 98 each implementing one or more of pixel circuitry, touch sensor circuitry, force sensor circuitry, and/or any other desired circuitry for forming active area AA of display 14. Display 14 may include a dielectric cover layer such as display cover layer 100 that overlaps display module 89. Display cover layer 100 may include plastic, glass, sapphire, ceramic, and/or any other desired dielectric materials. The active area of display module 89 may emit image light and may receive sensor input (e.g., touch and/or force sensor input) through display cover layer 100. Display cover layer 100 and display 14 may be mounted to conductive housing structures (structures 12W in FIG. 1). An inactive area IA of display 14 may surrounded the active area AA of display 14.

Display backplate 90 may serve as a structural support structure supporting display layers 98 and as an electrical ground for components in device 10 (e.g., a reference ground for components implemented by display layers 98, an antenna ground for wireless communication circuitry 34, etc.). To effectively serve its functions, display backplate 90 may extend across substantially the entire active area AA of display 14.

Frame structure 92 may run along the periphery (e.g., rectangular periphery as shown in FIG. 7) of display cover layer 100 and serve as a structural support structure, in combination with other intervening structures 102 such as adhesive layers, polymer layers, etc., for display cover layer 100. If desired, frame structure 92 may have engagement mechanisms that allow display 14 (e.g., the display assembly) to be mounted to and engage corresponding mechanism in the housing (e.g., corresponding engagement mechanisms on peripheral housing structures 12W in FIG. 1 forming a housing assembly).

Conductive interconnect structure 97 may extend across (bridge) gap 94 separating display backplate 90 from frame structure 92. Interconnect structure 97 may connect to display backplate 90 via contacts 104 and may connect to frame structure 92 via contacts 106 and 108.

Slot element 80 formed in frame structure 92 may extend entirely through frame structure 92 in the z-dimension and may have sides defined by corresponding portions of frame structure 92 in the x- and y-dimensions. Contacts 106 may be on one side of slot element 80, while contacts 108 may be on an opposing side of slot element 80.

Figure 9:
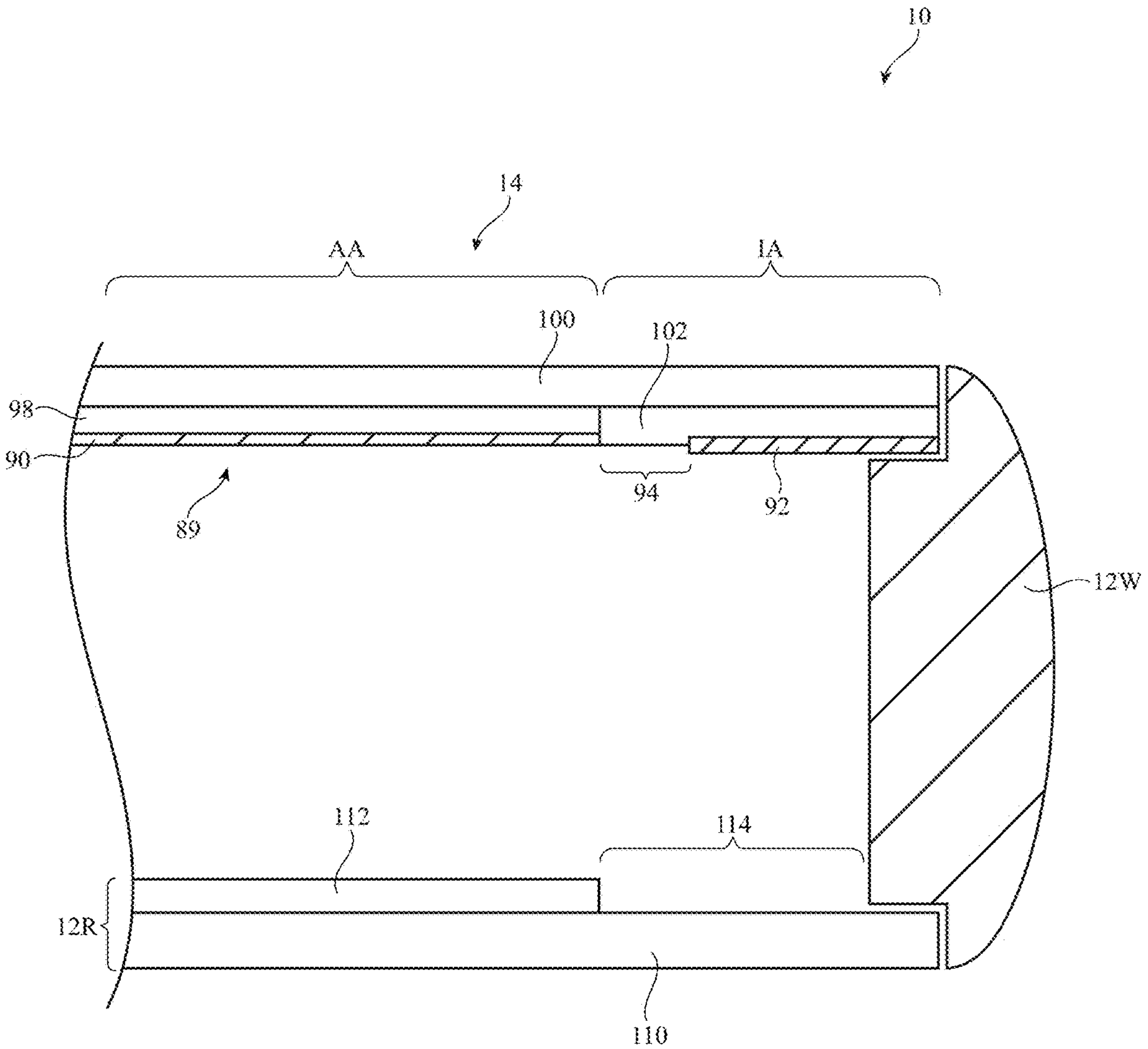
FIG. 9 is a cross-sectional view of an illustrative electronic device portion having multiple ground structures that may implement a slot element for rejecting signals at one or more victim frequencies in accordance with some embodiments.

The example of FIG. 8 is merely illustrative. In general, any suitable ground structure in device 10 may include victim frequency rejection structures. FIG. 9 is cross-sectional side view of device 10, showing illustrative conductive electronic device structures that may be used in forming one or more portions of an antenna ground (of one or more of antennas 40) in device 10.

As shown in FIG. 9, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 9 (e.g., a given sidewall that runs along an edge of device 10 and that extends across the width or length of device 10).

As shown in FIG. 9, rear housing wall 12R may be mounted to peripheral conductive housing structures 12W (e.g., opposite display 14). Rear housing wall 12R may include a conductive layer such as conductive support plate 112. Conductive support plate 112 may extend across an entirety of the width of device 10 (e.g., between the left and right edges of device 10 as shown in FIG. 1). Conductive support plate 112 may have an edge that is separated from peripheral conductive housing structures 12W by dielectric-filled slot 114. Slot 114 may be filled with air, plastic, ceramic, or other dielectric materials. Conductive support plate 112 may, if desired, provide structural and mechanical support for device 10.

If desired, rear housing wall 12R may include a dielectric cover layer such as dielectric cover layer 110. Dielectric cover layer 110 may include glass, plastic, sapphire, ceramic, one or more dielectric coatings, or other dielectric materials. Dielectric cover layer 110 may be layered under conductive support plate 112 (e.g., conductive support plate 112 may be coupled to an interior surface of dielectric cover layer 110). If desired, dielectric cover layer 110 may extend across an entirety of the width of device 10 and/or an entirety of the length of device 10. Dielectric cover layer 110 may overlap slot 114.

Conductive housing structures such as conductive support plate 112 and/or peripheral conductive housing structures 12W (e.g., the portion of peripheral conductive housing structures 12W opposite conductive support plate 112 at slot 114) may be used to form antenna structures such as antenna ground portions for one or more of antennas 40 in device 10. For example, conductive support plate 112 may be used to form an antenna ground plane for one or more of antennas 40 in device 10. One or more portions of peripheral conductive housing structures 12W may also form corresponding antenna ground portions for one or more of antennas 40 in device 10. In one illustrative configuration, peripheral conductive housing structures 12W may include multiple dielectric gaps (e.g., dielectric gaps 18 of FIG. 1) that divide the peripheral conductive housing structures into multiple segments, some of which may serve as or define antenna resonating elements and some of which may serve as an extension of the antenna ground plane formed by support plate 112.

In general, victim frequency rejection structures such as slot element 80 overlapping a grounding interconnect structure with non-ohmic contacts may be formed in any of these ground structure portions described in connection with FIG. 9 or other ground structure portions in device 10 (e.g., conductive traces on printed circuit boards or other substrates, sheet metal, metal foil, other conductive structures associated with display 14, other conductive portions of housing 12, etc.

Figure 10:
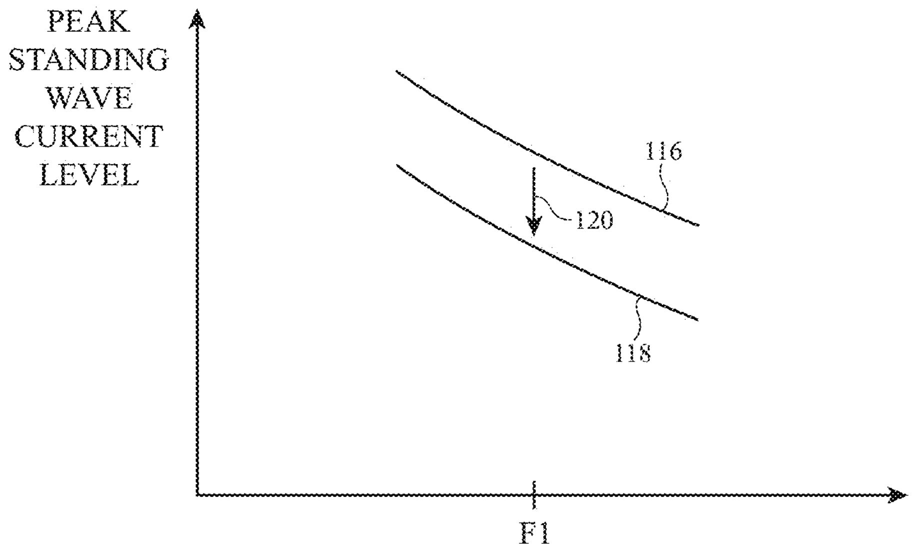
FIG. 10 is a plot showing how a slot element coupled to an interconnecting element between ground structures reduces peak standing wave current amplitude at an illustrative victim frequency in accordance with some embodiments.

FIG. 10 is a plot showing how the implementation of a victim frequency rejection structure (e.g., slot element 80 as described in connection with FIGS. 5-9) may help reduce standing waves (e.g., peak standing wave current amplitude) at a victim frequency. Curve 116 plots peak standing wave current amplitude on a ground structure receiving spurious signals from a grounding interconnect structure with non-ohmic contacts without a victim frequency rejection structure. Curve 118 plots peak standing wave current amplitude on a ground structure having a victim frequency rejection structure (e.g., a slot element in the ground structure with dimension for rejecting a victim frequency F1) when receiving spurious signals containing victim frequency F1.

As shown in FIG. 10, at victim frequency F1, peak standing wave current amplitude may exhibit a decrease 120 from curve 116 to 118. In some illustrative examples (e.g., at victim frequencies of 2.4 GHz and/or 5.5 GHz with the implemented elongated slot element having a length 10 mm), decrease 120 may be approximately 15 dB. The example of FIG. 10 is merely illustrative and, in practice, curves 116 and 118 may have other shapes.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An antenna comprising:
a first antenna ground structure;
a second antenna ground structure separated from the first antenna ground structure by a non-conductive gap; and
a conductive interconnect structure that extends across the non-conductive gap and couples the first antenna ground structure to the second antenna ground structure, the first antenna ground structure having a slot element and the conductive interconnect structure being coupled across the slot element, wherein the conductive interconnect structure provides a shorting path between the first antenna ground structure and the second antenna ground structure.

2. The antenna defined in claim 1, wherein the conductive interconnect structure is electrically shorted to the first antenna ground structure on opposing first and second sides of the slot element.

3. The antenna defined in claim 2, wherein the slot element has peripheral sides defined by the first antenna ground structure.

4. The antenna defined in claim 3, wherein the slot element is configured to be excited by the conductive interconnect structure to cause a standing wave between the peripheral sides of the slot element defined by the first antenna ground structure.

5. The antenna defined in claim 1, wherein the conductive interconnect structure forms non-ohmic contacts with the first antenna ground structure on opposing first and second sides of the slot element.

6. The antenna defined in claim 5, wherein the conductive interconnect structure comprises a conductive tape, a conductive adhesive layer, or a conductive foam.

7. The antenna defined in claim 1 further comprising:
an antenna resonating element; and
an antenna feed having a first antenna feed terminal coupled to the antenna resonating element and a second antenna feed terminal coupled to the second antenna ground structure.

8. The antenna defined in claim 1, wherein the first antenna ground structure is formed from a first conductive structure in a display assembly and the second antenna ground structure is formed from a second conductive structure in the display assembly.

9. An electronic device comprising:
a first antenna ground structure;
a second antenna ground structure;
an interconnect structure electrically connecting the first antenna ground structure to the second antenna ground structure and configured to generate radio-frequency signals at a victim frequency; and
a victim frequency rejection slot element in the first antenna ground structure configured to be excited by the interconnect structure and to exhibit a resonance peak at an additional frequency that is different from the victim frequency, wherein the first antenna ground structure has first and second portions that form first and second opposing edges of the victim frequency rejection slot element.

10. The electronic device defined in claim 9, wherein the first antenna ground structure has third and fourth portions that form third and fourth opposing edges of the victim frequency rejection slot element.

11. The electronic device defined in claim 9, further comprising:

an additional victim frequency rejection slot element in the second antenna ground structure.

12. The electronic device defined in claim 9 further comprising:

wireless circuitry having a portion subject to interference by the radio-frequency signals at the victim frequency.

13. The electronic device defined in claim 12, wherein the wireless circuitry has an additional portion configured to convey radio-frequency signals at an aggressor frequency and the interconnect structure is configured to generate the radio-frequency signals at the victim frequency based on the radio-frequency signals at the aggressor frequency.

14. The electronic device defined in claim 13, wherein the interconnect structure generates the radio-frequency signals at the victim frequency based on a non-ohmic contact with the first antenna ground structure.

15. The electronic device defined in claim 13, wherein the victim frequency is a harmonic frequency of the aggressor frequency or a frequency associated with an intermodulation product based on the aggressor frequency.

16. The electronic device defined in claim 9 further comprising:

a display having a display layer that forms display pixel circuitry and a display cover layer overlapping the display layer, wherein a first conductive structure overlapping the display forms the first antenna ground structure and a second conductive structure overlapping the display cover layer forms the second antenna ground structure.

17. The electronic device defined in claim 16, wherein the first conductive structure extends across an active area of the display and the second conductive structure runs along a periphery of the display.

18. An electronic device comprising:

wireless circuitry configured to convey radio-frequency signals at a frequency, the wireless circuitry having an antenna ground that includes:

a first conductive ground structure, a second conductive ground structure separated from the first conductive ground structure by a gap, a grounding interconnect structure, and a dielectric-filled slot in the first conductive ground structure, wherein the dielectric-filled slot is a closed slot surrounded by the first conductive ground structure, and the grounding interconnect structure extends across the gap and across the dielectric-filed slot, is coupled to the first conductive ground structure on opposing sides of the closed slot, and is coupled to the second conductive ground structure.

19. The electronic device defined in claim 18, wherein the wireless circuitry includes a radio-frequency transmission line path having a ground conductor coupled to the grounding interconnect structure using an antenna feed terminal coupled to the antenna ground, and the ground conductor conveys the radio-frequency signals at the frequency to the grounding interconnect structure.

20. The electronic device defined in claim 18, wherein the frequency is in a wireless local area network (WLAN) frequency band or a wireless personal area network (WPAN) frequency band.

* * * * *